United States Patent Office 2,970,821
Patented Feb. 7, 1961

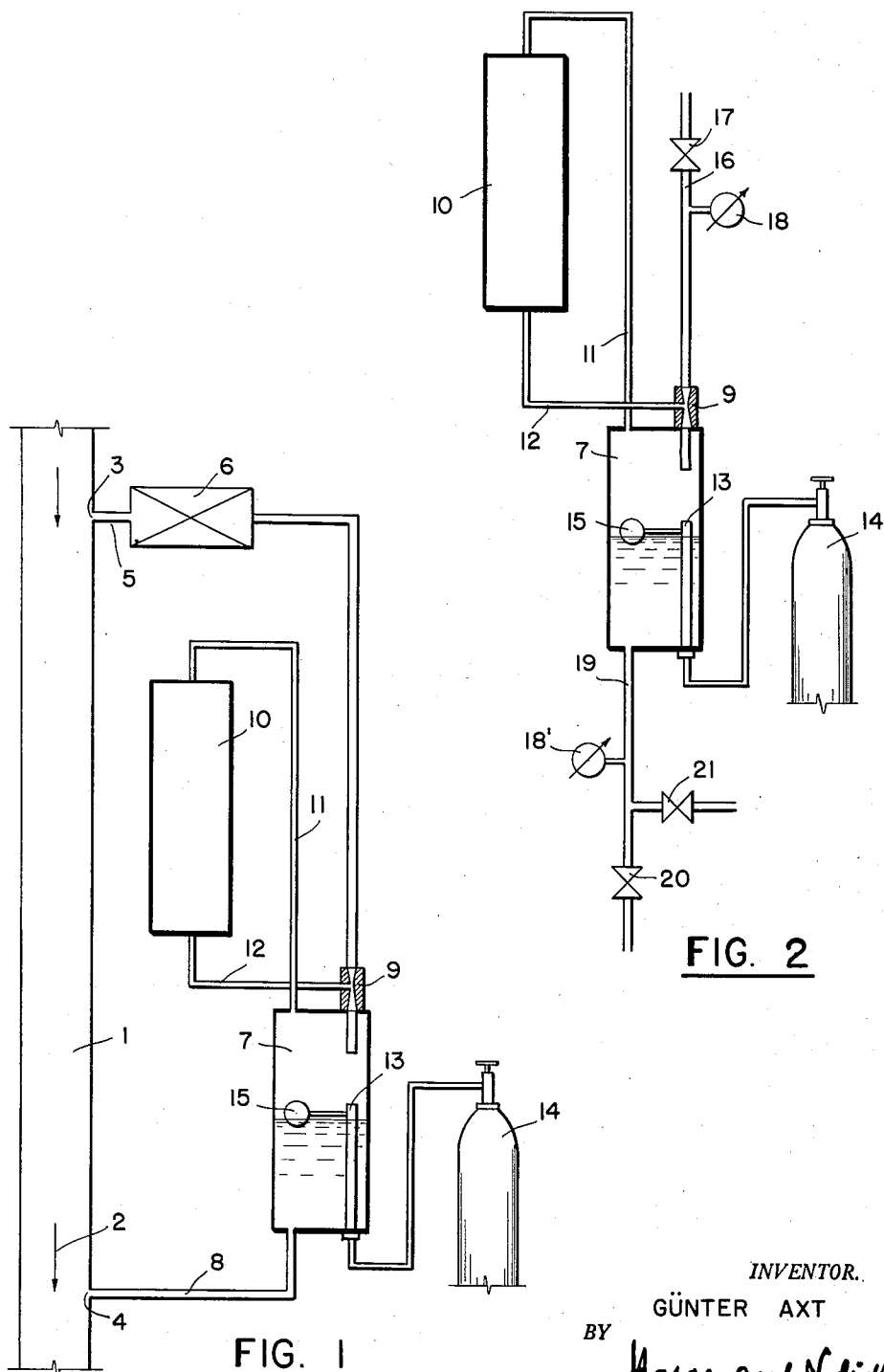

2,970,821

OZONIZING INSTALLATION

Günter Axt, Karlsruhe-Durlach, Germany, assignor to Chlorator G.m.b.H., Grotzingen, Karlsruhe, Germany Filed Aug. 22, 1956, Ser. No. 605,610

5 Claims. (Cl. 261—16)

This invention relates to ozoning installations as used, for example, in the sterilization of water. In particular it is directed to a novel system for effectuating ozonization.

Heretofore the incorporation of ozone in water in order to obtain bactericidal action was accomplished by bringing the liquid in contact with air that has been passed through an ozonizing apparatus. The desired solution of ozone in the liquid was achieved, for example, by means of injector or a foam generator. It was necessary thereafter to allow the excess of air to escape from the mixing vessel at normal pressure after which a renewed increase in pressure had to be created when it was desired to pass the liquid enriched with ozone through a pressure conduit.

It has also been proposed (see Swiss Patent 288,176) that the ozone-containing air which has been brought in contact with the liquid be ozonized in the mixture to recycle it continuously in a closed system including the ozone generator while simultaneously replacing the consumed ozone by fresh air. In such an installation the admission of fresh air is controlled by an automatic valve which in turn is controlled by regulating means responsive to the ozone-content of the air mixture.

In an arrangement of that type, a continuous enrichment with nitrogen of the ozone-air mixture that is directed through the mixer occurs, as a consequence of which it was necessary to move an ever increasing ballast of nitrogen through the ozone generator included in the gas recycle system with resultant continuous deterioration of the efficiency of the ozone-generator. When it was then intended further to conduct the water enriched with ozone, an escape of the excess of the gas could not be avoided which entails a further installation for increasing the pressure when it is necessary to transport the water enriched with ozone through a pressure conduit. Furthermore, the necessity of including an installation for regulating the admission of fresh air in response to the ozone content within the mixture which must be continuously supervised, constitutes an undesirable complication of the installation due to the requirement of regulating means responsive to the ozone content.

It is further known to produce ozone from pure oxygen in the known tube discharge devices and to bring the ozone-oxygen mixture in contact with the water. Such an arrangement entails a removal of the non-reacted oxygen from the water, generally at normal pressure. That in turn necessitates the provision of devices for subsequently increasing the pressure when the ozonized water is further to be conducted through the pressure conduit.

Finally, it is known to produce an aqueous preliminary solution rich in ozone and then to add this solution to the main volume of the water that is to be ozonized.

It is among the principal objects of this invention to provide an economically operating ozonizing installation which is capable of operating without complicated and space occupying pressure-reducing and subsequent pressure-increasing devices, and which permits a continuous operation of the installation by means of simple regulating means. A further object of this invention is to provide an installation which permits enrichment of the liquid to be treated with ozone practically without loss of ozone.

The foregoing objects and advantages of this invention are achieved by an ozonizing installation in which the liquid to be ozonized is brought into intimate contact with ozone-containing gas in a mixer whereby the gas is continuously recycled in a closed circuit, including an ozone generator, while the consumed ozone is simultaneously replenished by adding fresh air in such arrangement that the mixer included in the gas recycling circuit operates under elevated pressure and the fresh gaseous oxygen is added under the control of a regulating valve responsive to the level of the liquid in the mixing chamber.

By reason of the fact that the absorption of the ozone by the liquid takes place under elevated pressure, and the fact that the ozone is produced from oxygen, it is possible to obtain a preliminary solution with an especially high degree of saturation of ozone. Due to the fact that no excess gas is discharged into the atmosphere, the circuit being closed, the further use (either as liquid for admixture with the main volume of liquid flowing through a pressure conduit, or for independent purposes, as for example as a bleaching liquid), it is possible to operate with practically no loss of ozone as contrasted with preliminary solutions which are not saturated with ozone under elevated pressure wherein the ozone concentration is lower. As experience has shown, preliminary solutions of lower concentrations always result in substantial losses of ozone since the residual gas ($O_2$, $N_2$ or air) is always accompanied by some ozone. Furthermore, the fact that the addition of fresh oxygen to replace the consumed ozone is not controlled by regulating means responsive to the ozone contained in the gas mixture, as in the prior systems, but by a regulating valve which is simply responsive to the level of the liquid in the mixing chamber, as in the present invention, permits the use of a simple and reliable regulating device as, for example, a float valve.

When it is desired to ozonize water flowing through a pressure pipe or kept under pressure, the arrangement, in accordance with this invention, is preferably such that a small fraction of the water to be treated is conducted in a closed circuit to the mixing chamber and returned from the mixing chamber, without loss of pressure, into the main volume of the water in the form of highly ozonized-saturated solution. No specific means are necessary for reducing the pressure and removing the unconsumed oxygen or the oxygen that has not reacted with the ozone. The mixture which is at the pressure of the pipe system and the gas circulating system for the gas connected to the mixer including the ozone generator, operates within a closed pressure system on the pressure of this system and occupies minimal space.

The installation in accordance with this invention is particularly simple when, according to a preferred embodiment, the oxygen is circulated within the ozone generating system by means of an injector discharging into the mixing chamber and which is operated by the stream of water which is to be saturated with ozone. This injector is simultaneously employed to exert suction on the ozone-containing gas from the ozone generator and to circulate the gas.

In the accompanying drawing several embodiments of the invention are shown by way of illustration and not by way of limitation.

In the drawing:

Fig. 1 shows diagrammatically the ozonization installation in accordance with this invention in circuit with a water pipe under pressure, and, Fig. 2 shows diagrammatically a similar installation for producing ozonized water which may be employed for a suitable purpose.

Referring first to Fig. 1, the installation shown therein comprises a pressure conduit pipe 1, through which water to be treated with ozone may flow in the direction of arrow 2. In such pipes, pressures between 3 and 12 atmospheres above atmospheric pressure may be present; and long distance pipes may employ pressures up to 20 atmospheres above atmospheric pressure.

To sterilize the water in pipe 1, by means of ozone, the pipe or conduit 1 is tapped at points 3 and 4 and a by-pass is formed in the closed system which is under the pressure of the main pipe and through which flows a fraction of the water flowing through pipe 1. The inlet pipe 5 of the by-pass includes a pressure-elevating pump 6 which provides the assurance that the branch flow in the by-pass has a required flow velocity. The by-pass further includes a mixing vessel 7 which is partly filled with water. The water in the branch or by-pass system is returned to the main pipe 1 through the outlet pipe 8, in consequence of which the highly concentrated ozone solution produced in mixing vessel 7, mixes with the main volume of the water to be treated.

Inlet pipe 5 is connected with the mixing vessel 7 through an injector 9 located in the upper or gas space of chamber 7. This gas space of the chamber is further connected to a gas circulating system which conducts the gas content in the gas space through an ozonizing device or means 10. This device 10 which may be visualized as of conventional design, comprises one or several pressure-resistant ozone tubes of usual output with a narrow wall (short discharge gap) for the purpose of obtaining an ozone concentration as high as possible. The ozone generator device preferably, also includes a device for drying the gas before entering the ozone tubes. Drying devices of this type are also well known in the art; and a detailed description of the device 10 and the accessories thereof are not essential for an understanding of the invention. The gas is admitted from the mixing chamber 7 to the top of 10 through pipe 11. The gas which passes along the ozonizing tubes in device 10 moves through pipe 12 under the suction action of injector 9 and is mixed in the injector with the water pumped through the branch circuit by means of pump 6.

The ozone concentration in the water is in equilibrium with the partial pressure of the ozone in the gaseous phase. Since this partial pressure is much higher than that obtainable in installations heretofore known (factor 50), the ozone concentration in the water is also above a level higher than that heretofore obtainable. Pipe 13 extends into the mixing chamber 7 through the bottom thereof. This pipe communicates through an open valve with an oxygen cylinder or bottle 14. A float valve 15 in the mixing chamber 7 continuously and automatically regulates the admission of oxygen so that the float valve opens when the gas volume decreases, that is, when the liquid level in the mixing chamber rises by the absorption of the formed ozone and closes again when the liquid level falls below a predetermined level.

The pumping rate of pump 6 is such that in continuous operation when the water in the mixing chamber is completely saturated with ozone, just that volume of water (while slightly increasing the pressure) flows through the branch line which is required for operation of the injector.

Due to the materially high solubility of ozone in water, as compared with the solubility of oxygen (the ratio of solubility is about 20:1 at atmospheric pressure and does not change materially at the elevated working pressure in the mixing chamber), a liquid saturated practically with ozone alone is discharged from the branch line. It is not necessary to remove the residual fresh gas which has not been converted into ozone from the mixing chamber and possibly under reduction of pressure, since the unconsumed oxygen (the unreacted oxygen) is always circulated in the closed circuit including the ozone generator; and the regulating valve 15 supplies additional oxygen from the oxygen supply only to the extent that the ozone is generated and absorbed. The highly concentrated ozone solution produced in this manner is, as experience has shown, much more advantageous against loss in free storage or transport than is a less concentrated ozone solution.

It is essential that in the apparatus of this invention, the ratio of the partial pressures of ozone to oxygen which determines the solubility of the gases, be always kept as high as possible. This is continuously and readily obtainable by means of the described apparatus in a continuous operation. The elevated pressure which prevails in the main line and the by-pass line facilitates the production of a highly concentrated ozone solution. To operate the injector in the exemplified form of the invention a slight elevated pressure of the magnitude of one atmosphere is sufficient. Such elevated pressure is maintained by the pump 6 interposed between the inlet and the outlet side of the injector. When it is intended to destroy pathogenic germs in 100 cubic meters per hour, an ozone charge of 0.03 milligram per liter is required for the purpose. To attain this end, 100 liters of water per hour are sucked from the main line into the by-pass line in which said 100 liters are saturated with ozone by means of the injector. Hence 30 grams of ozone per hour are consumed in the branch line, which means that in the presence of, for example, 5 atmospheres above atmospheric pressure about 600 grams of gas per hour must be circulated in the ozonizing gas circuit. Under such conditions, a gas having an ozone content of 60 grams emerges from the ozonizing system, an aforecalculated 30 grams of ozone itself in the by-pass circuit and the remaining 30 grams recycled through the ozone generating circuit.

The embodiment in accordance with Fig. 2 is an installation for manufacturing a highly concentrated ozone solution which may be used for any desired purpose. The components of the installation of Fig. 1 corresponding to the similar components of Fig. 1 are designated by the same reference numerals. The water used for the production of the ozone solution is introduced from a pipeline 16 into the mixing chamber 7 through injector 9. Pipe 16 includes a control valve 17 and may also include a manometer 18. The ozonized liquid emerging from the nozzle of the injector collects in the lower part of the mixing chamber 7. The ozonized liquid is discharged from chamber 7 through pipe 19 which also includes a control valve 20; and may further include a manometer 18' and be connected to a branch line which includes a check valve 21.

Pipe 13 through which oxygen enters the mixing chamber terminates in the gas space of chamber 7 above the liquid level; and is connected to oxygen cylinder or bottle 14 equipped with a conventional check valve.

Instead of supplying the oxygen from a bottle the same may also be supplied from another oxygen supply such as an installation operating under electrolysis and such an installation may, of course, also be employed in the installation of Fig. 1.

The oxygen feed is controlled by float valve 15. The upper part of the mixing chamber is connected to the gas inlet pipe 11 and gas outlet pipe 12 to form the gas circuit. This gas circuit includes the ozone generator 10 equipped with the conventional tube arrangement. Injector 9 sucks the ozonized gas mixture from the ozone generator and causes an intimate mixture of the gas with the water. The water pressure in the mixing chamber is controlled by means of valves 17 and 20; and the supply of fresh oxygen to replace the absorbed ozone is controlled by the float valve 15. This valve opens the check valve of the oxygen supply in a conventional manner upon the decrease of the gas volume in the mixing chamber. A suitable setting of the valve permits a continuous operation in the same manner as above described. The water saturated with ozone which collects under pressure in the mixing chamber may be tapped at the lower part of the chamber and utilized for any desired purpose.

It will be understood that the foregoing description of the invention and the embodiments described are merely illustrative of the principles thereof. Accordingly, the appended claims are to be construed as defining the invention within the full scope and spirit thereof.

I claim:

1. An installation for ozonizing water flowing under pressure through a water main, said installation comprising a closed mixing container having a water inlet and a water outlet, a feed branch pipe connecting said main with said inlet and a discharge branch pipe connecting said outlet with said main for effecting a fractional water flow under pressure through said mixing container, said container being partly filled with water to define a gas space therein, said feed branch pipe issuing in the gas space of the container, an ozone generator having an intake side and a discharge side, a feed pipe connecting said gas space with the intake side of the generator, a discharge pipe connecting the discharge side of the generator with said feed branch pipe, a suction means included in said feed branch pipe for creating suction in the discharge pipe of the generator to effect a flow of ozone through the generator, a conduit connecting said container with a supply of pure oxygen for feeding oxygen in gaseous form into said container, and a liquid level gauge in said container detecting the lever of water therein, the flow of oxygen into the container being controlled by said liquid level gauge in accordance with the water level detected by the same, the admission of gaseous oxygen making up for ozone admitted into the gas space and absorbed by the water in the container.

2. An installation according to claim 1 wherein said suction means comprises a venturi type injector, said discharge pipe of the ozone generator communicating with the throat of said injector thereby creating suction within said discharge pipe.

3. An installation according to claim 1 wherein a pump means is included in said feed branch pipe anterior of said suction means in the direction of the water flow through said feed branch pipe, said pump means providing additional water pressure in said feed branch pipe.

4. An installation for ozonizing a liquid flow through a pipe line, said installation comprising a closed mixing container having an inlet and an outlet included in said pipe line for directing a flow of liquid through said container, the container being partly filled with liquid to define a gas space therein, an ozone generator having an intake side and a discharge side, a feed pipe connecting said gas space with the intake side of said generator, a discharge pipe connecting the discharge side of said generator with said pipe line upstream of the container, a suction means included in the pipe line upstream of the container for creating suction in the discharge pipe of the generator to effect a flow of ozone through said generator, a conduit connecting said container with a supply of pure oxygen for feeding oxygen in gaseous form into said container, and a liquid level gauge in said container to detect the liquid level therein, the flow of oxygen into the container being controlled by said liquid level gauge in accordance with the liquid level detected by the same, the admission of gaseous oxygen making up for ozone admitted into the gas space and absorbed by the liquid in the container.

5. An installation according to claim 4 wherein said suction means comprises a venturi type injector, said discharge pipe of the ozone generator communicating with the throat of said injector thereby creating suction within said discharge pipe.

References Cited in the file of this patent

UNITED STATES PATENTS

| | | |
|---|---|---|
| 951,789 | Ashley | Mar. 15, 1910 |
| 996,560 | Bradley | June 27, 1911 |
| 2,043,701 | Hartman | June 9, 1936 |
| 2,050,771 | Wait | Aug. 11, 1936 |
| 2,400,439 | Romans | May 14, 1946 |
| 2,405,553 | Allison | Aug. 13, 1946 |
| 2,606,150 | Thorp | Aug. 5, 1952 |
| 2,660,559 | Prime | Nov. 24, 1953 |

FOREIGN PATENTS

| | | |
|---|---|---|
| 17,267 | Great Britain | of 1906 |
| 572,766 | Germany | Mar. 22, 1933 |